(12) United States Patent
Okada

(10) Patent No.: US 7,437,967 B2
(45) Date of Patent: Oct. 21, 2008

(54) GEAR HAVING WINDOW HOLES, AND METHOD AND APPARATUS FOR MANUFACTURING THE SAME

(75) Inventor: Tomoyoshi Okada, Nagoya (JP)

(73) Assignee: O-Oka Corporation, Toyota-shi (JP)

( * ) Notice: Subject to any disclaimer, the term of this patent is extended or adjusted under 35 U.S.C. 154(b) by 269 days.

(21) Appl. No.: 10/442,256

(22) Filed: May 21, 2003

(65) Prior Publication Data

US 2004/0231448 A1    Nov. 25, 2004

(51) Int. Cl.
    *F16H 55/08*    (2006.01)
(52) U.S. Cl. .............................. 74/457; 74/460; 74/462
(58) Field of Classification Search .............. 74/412 R, 74/414, 434, 457, 460, 462
    See application file for complete search history.

(56) References Cited

U.S. PATENT DOCUMENTS

| | | | | |
|---|---|---|---|---|
| 4,938,089 A | | 7/1990 | Ohoka | |
| 5,337,626 A | * | 8/1994 | Everts et al. | 74/445 |
| 5,913,939 A | * | 6/1999 | Tanaka | 74/434 |
| 5,957,000 A | * | 9/1999 | Pecorari | 74/425 |
| 6,293,165 B1 | * | 9/2001 | Ohkawara et al. | 74/421 R |
| 2004/0231448 A1 | * | 11/2004 | Okada | 74/431 |
| 2005/0081668 A1 | * | 4/2005 | Hagihara | 74/458 |
| 2005/0160857 A1 | * | 7/2005 | Takeuchi | 74/425 |

FOREIGN PATENT DOCUMENTS

| | | |
|---|---|---|
| JP | 2001-1102 | 1/2001 |
| JP | 2002-96136 | 4/2002 |

* cited by examiner

*Primary Examiner*—David M Fenstermacher
(74) *Attorney, Agent, or Firm*—Oblon, Spivak, McClelland, Maier & Neustadt, P.C.

(57) ABSTRACT

A gear having window holes, and method and apparatus for mafufacturing the same in which by depressing partially one end surface of a primary formed article, a plurality of concaves for the window holes is formed at the one end surface in an axial direction of the primary formed articles, a plurality of projections are extruded from the other end surface thereof and tooth forms preformed at an outer peripheral wall of the primary formed article is thrown out in radial direction thereof, and the gear is formed by cutting the plurality of projections extruded from the other end surface thereof.

5 Claims, 4 Drawing Sheets

PRODUCT HAVING WINDOW HOLE WITH BOTTOM

PRODUCT HAVING PENATRATED WINDOW HOLE

GEAR HAVING WINDOW HOLES, AND METHOD AND APPARATUS FOR MANUFACTURING THE SAME

TECHNICAL FIELD

This invention relates to gears having window holes such as a mulcher cone synchro mesh type clutch gear used for a manual transmission for an automobile and a method and apparatus for manufacturing the above described gears.

TECHNICAL BACKGROUND

A window hole of the gears having window holes are conventionally formed by forming a circular hole by drilling and reamer process, by boring by milling cutter and broaching or by blanking by press.

Drilling and reamer processes need a much greater expense for providing equipment for these processes and consumable tools and the forms for the window holes are limited to circular holes. Therefore, the degrees of freedom of the diameter of a circular hole process and so on are restricted according to the diameter of a clutch gear.

Moreover, because the clutch gear and the circular hole are formed in different processes, it is difficult to obtain accuracy of the hole forming phase i.e. the pitch of holes against the clutch gear.

Furthermore, because cutting scraps become attached and weld flashes occur, it is difficult to secure quality and uniformity of products.

In milling cutter and broaching, the forms of window holes used are not limited to circular holes, but those process have problems in that as wear and tear on the equipment occurs and the need for tools specific to cutting, inefficiency, the occurrence of cutting scraps and weld flashes, the difficulty of securing hole phases against the clutch gear and the requirement of providing a clearance for tools used in the processes must be taken into account. Therefore, in those processes, products often have defects in terms of strength.

Compared to these processes, in blanking by press machining, the time required is shorter and the forms of window hole are free to choose from. Therefore, blanking by press is well-suited to mass production.

Window holes formed by blanking by press have a weld flash in a blanking direction. Therefore, it is necessary to rework the gear by cutting in order to delete the weld flash after blanking and the structure of a die for blanking is complex in order to delete the potential for weld flash.

Furthermore, cutting during the reworking causes an interruption in cutting completion. Therefore, the resultant tool life is short, the window holes are limited to being penetrated holes and it is difficult to maintain a uniform tooth form due to the difference in pressure strength between a tooth form formed near by the window hole and a tooth form formed far from the window hole, while blanking.

DISCLOSURE OF THE INVENTION

The inventor of the present invention has turned his attention to a first technical concept of the present invention in that by depressing partially one end surface of a primary formed article, a plurality of concavities for the window holes are formed at the one end surface in an axial direction of the primary formed articles, wherein the plurality of projections are extruded from the other end surface thereof and the tooth forms preformed at an outer peripheral wall of the primary formed article extend out in a radial direction thereof.

The inventor of the present invention also has paid attention to a second technical concept of the present invention by adopting a procedure to cut a plurality of projections extruded from the other end surface thereof.

Further, the inventor of the present invention has adopted a third technical concept of the present invention in that a plurality of concavities for window holes are formed by cutting.

Based on these technical concepts, the inventor of the present invention has made further extensive studies and developments and has achieved the present invention.

It is an object of the present invention to keep the resulting effects on the tooth forms to a minimum, to increase the degree of forms of window holes that can be used and to improve the resultant precision.

A gear having window holes of the present invention (the first invention described in the present application), in which by depressing partially one end surface of a primary formed article, a plurality of concavities for the window holes are formed at the one end surface in an axial direction of the primary formed articles, a plurality of projections are extruded from the other end surface thereof, and tooth forms are preformed at an outer peripheral wall of the primary formed article extend outwardly in the radial direction thereof.

A gear having window holes of the present invention (the second invention described in the present invention) according to the first invention is also provided, in which the gear is formed by cutting the plurality of projections extruded from the other end surface thereof.

A gear having window holes of the present invention (the third invention described in the present invention) is also disclosed, in which by depressing partially one end surface of a primary formed articles, a plurality of concavities for window holes are formed at one side surface in an axial direction of the primary formed articles, a plurality of projections are extruded from the other surface thereof, and tooth forms are preformed at an outer peripheral wall of the primary formed articles is thrown out in radial direction thereof.

A method for manufacturing a gear having window holes of the present invention (the fourth invention described in the present application), comprises a step of depressing partially one end surface in an axial direction of a primary formed articles, whereby a plurality of concavities for the window holes are formed at the one end surface in an axial direction of the primary formed articles, a plurality of projections are extruded from the other end surface thereof, and tooth forms preformed at an peripheral wall of the primary formed article are thrown out in radial directions thereof.

A method for manufacturing a gear having window holes of the present invention the present invention according to fourth embodiment, comprises the step of cutting a plurality of projections extruded from the other end surface thereof to form the gear.

A further method for manufacturing a gear having window holes of the present invention in another embodiment comprises the steps of cutting a plurality of projections extruded from the other end surface thereof just before reaching a bottom of the caves and forming window holes with bottom.

Another method for manufacturing a gear having window holes of the present invention according to a further embodiment, comprises the steps of cutting a plurality of projections extruded from the other end surface thereof until reaching a bottom of the cavities and forming penetrated window holes.

A further method for manufacturing a gear having window holes of the present invention includes a step of depressing partially one side surface of the primary formed article, whereby a plurality of concavities for poles is formed at the one side surface of the primary formed article, a plurality of projections are extruded from the other side surface thereof, tooth forms preformed at an peripheral wall project out in radial directions thereof and a plurality of projections are cut to form the gear.

An apparatus for manufacturing a gear having window holes of the present invention is directed to another embodiment, which comprises a device for depressing partially one end surface in an axial direction of a primary formed articles, whereby a plurality of concavities for the window holes are formed at the one end surface in an axial direction of the primary formed article, a plurality of projection are extruded from the other end surface thereof, and tooth forms preformed at an peripheral wall of the primary formed article protecting out in radial direction thereof.

An apparatus for manufacturing a gear having window holes according to the present invention including a forging device for partially depressing one end surface in an axial direction of a primary formed article, a plurality of projection being extruded from the other end surface thereof and tooth forms preformed at a peripheral wall projecting out in a radial direction thereof.

A yet further apparatus for manufacturing a gear having window holes in the present invention is provided, in which the forging device comprises tooth forms for forming tooth forms at an inner circumferential wall, and includes a drag having counter punches for forming concavities at a bottom thereof and a cope having concavities formed for the escape of pads in portions corresponding to the counter punches.

Another apparatus for manufacturing a gear having window holes of the present invention, in which the drag comprises tooth forms for forming tooth forms at an inner circumferential surface of a cavity, and includes ejectors arranged at a center of a bottom part of the cavity which are able to go up and down through knockout pins and counterpunches positioned around the ejectors in order that the counter punches are interposed in a nib formed on a nib booth.

An additional apparatus for manufacturing a gear having window holes of the present invention according to another embodiment is disclosed, in which the plurality of punches comprising an inner punch, a center punch, and an outer punch concentrically arranged around a mandrel located in the center of the cope, and these punches are clumped with a cope clamp ring and are assembled as body part of the cope.

An additional apparatus for manufacturing a gear having window holes of the present invention is provided, in which concave portions for escape of the pads are formed in a portion, corresponding to the counterpunch of the drag, of the center punch of the cope and tooth forms corresponding to the tooth forms for forming tooth forms are formed on the inner circumferential surface of the cavity at the outer punch.

An A further apparatus for manufacturing a gear having window holes of the present invention is provided in which there is no phase lag between the tooth forms for forming tooth forms formed on the inner circumferential surface of the cavity and tooth forms formed at the outer punch.

In the gear having window hole according to the first embodiment having the above described construction, wherein by depressing partially one end surface of a primary formed article, a plurality of concavities for the window holes are formed at the one end surface in an axial direction of the primary formed articles, a plurality of projections are extruded from the other end surface thereof, and tooth forms preformed at an outer peripheral wall of the primary formed article extend out in a radial direction thereof. Accordingly the present invention has the effects of restraining influences on tooth forms to a minimum, to enlarge the degree of freedom of profile of window holes and to improve the precision or accuracy.

In the gear having window hole according to the present invention having the above described construction, wherein by depressing partially one end surface of a primary formed articles, a plurality of concavities for window holes are formed on one side surface in an axial direction of the primary formed articles, a plurality of projections are extruded from the other the surface thereof, and tooth forms preformed at an outer peripheral wall of the primary formed articles are projected out in radial direction thereof. Accordingly the present invention has the effects of restraining influences on tooth forms to minimum, of enlarging the degree of freedom of profile of window holes and of improving the precision or accuracy of manufacturing.

The method for manufacturing the gear having window holes according to the present invention having the above described construction, which includes a step of depressing partially one end surface in an axial direction of a primary formed article, whereby a plurality of concavities for the window holes are formed at the one end surface in an axial direction of the primary formed articles, a plurality of projections are extruded from the other end surface thereof, and tooth forms preformed at an peripheral wall of the primary formed article are projected out in radial directions thereof.

Accordingly the present invention has such effects to restrain influences on tooth forms to minimum, to enlarge the degree of freedom of profile of window holes and to improve the precision or accuracy.

The method for manufacturing the gear having window holes according to the present invention having the above described construction, also comprises the steps of cutting a plurality of projections extruded from the other end surface thereof just before reaching a bottom of the concavities and forming window holes. Accordingly the present invention has such effect to make it possible to provide gears with window holes with bottom portions.

The method for manufacturing the gear having window holes according to the present invention having the above described construction, comprises steps of cutting a plurality of projections extruded from the other end surface thereof until reaching a bottom of the concavities and forming penetrated window holes. Accordingly the present invention has such effect to make it possible to provide gears with penetrated window hole.

The method for manufacturing the gear having window holes according to the present invention having the above described construction, also comprises a step of depressing partially one side surface of the primary formed article, whereby a plurality of concavities are formed at one side surface of the primary formed article, a plurality of projections are extruded from the other side surface thereof, tooth forms preformed at an peripheral wall are projected out in radial directions thereof and a plurality of projections is cut to form the gear. Accordingly the present invention has the effects of restrain influences on tooth forms to minimum, of enlarging the degree of freedom of profile of window holes and of improving precision or accuracy in manufacturing.

The apparatus for manufacturing the gear having window holes according to the present invention also comprises a device for partially depressing one end surface in an axial direction of a primary formed articles, whereby a plurality of concavities for the window holes are formed at the one end surface in an axial direction of the primary formed article, a plurality of projections are extruded from the other end surface thereof, and tooth forms preformed at an peripheral wall of the primary formed article are projected out in a radial direction thereof.

Accordingly the present invention has the effect of restraining influences on tooth forms to minimum, enlarging the degree of freedom of profile of window holes and improving precision or accuracy.

The apparatus for manufacturing the gear having window holes according to the present invention having the above described construction also comprises a forging device for depressing partially one end surface in an axial direction of a primary formed article, a plurality of projections extruded from the other end surface thereof and tooth forms preformed at a peripheral wall project out in radial direction thereof. Accordingly the present invention has the effect of restraining influences on tooth forms to a minimum, enlarging the degree of freedom of profile of window holes and improving precision or accuracy in manufacturing.

BEST MODE FOR CARRYING OUT THE INVENTION

The best mode for carrying out the invention is described with reference to the accompanying drawings.

Embodiment

Gears having window holes, and the method and apparatus for manufacturing the same according to the embodiment of the present invention, are shown in FIGS. 1-5, in which by depressing partially one end surface of a primary formed article, a plurality of concavities for the window holes are formed at the one end surface in an axial direction of the primary formed articles, wherein a plurality of projections are extruded from the other end surface thereof, tooth forms preformed at an outer peripheral wall of the primary formed article are thrown out in radial direction thereof, and the gear is formed by cutting the plurality of projections extruded from the other end surface thereof.

Figure 1:
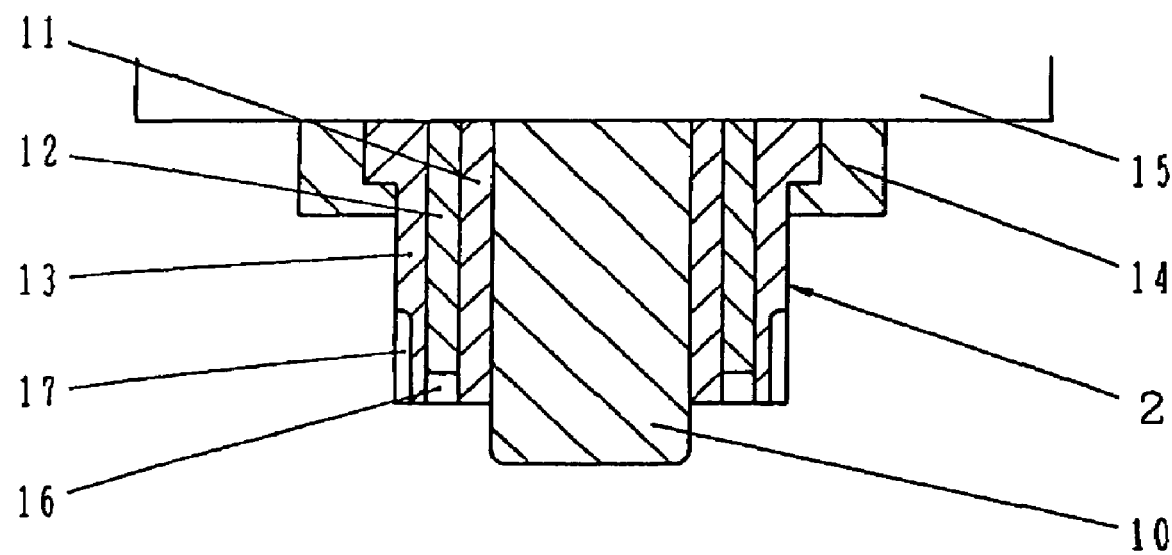
FIG. 1 is a sectional view showing an apparatus for manufacturing gears having window holes according to the embodiment of the present invention.
Figure 1:
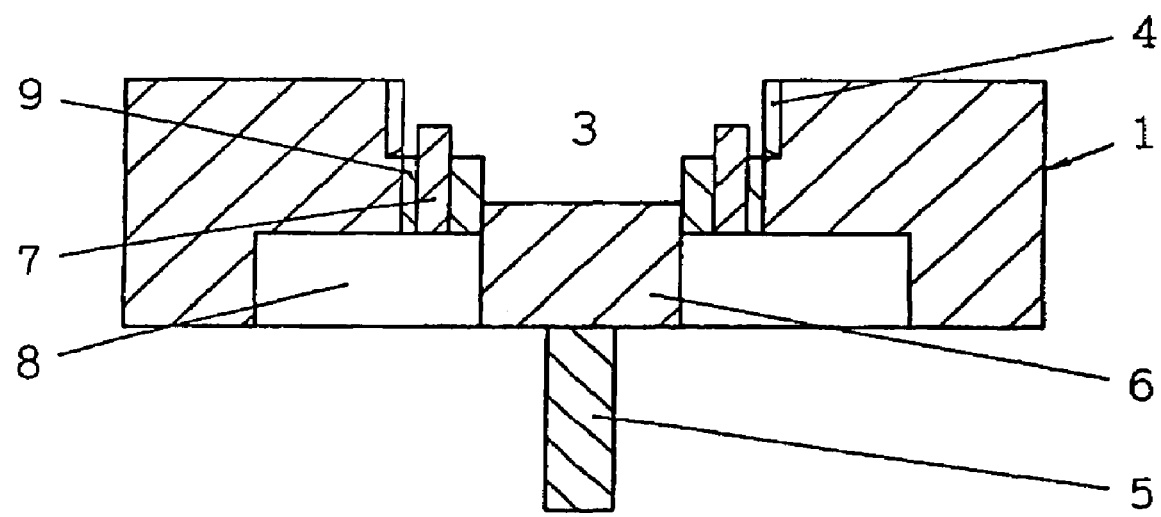

FIG. 1 is an illustrative view illustrating an apparatus for manufacturing the gears. Reference number 1 is a drag member, and 2 denotes a cope. The drag 1 comprises tooth forms 4 for forming tooth forms on an inner circumferential surface of a cavity 3, ejectors 6 are arranged at a center of a bottom part of the cavity 3 moving up and down through knockout pins 5 and counterpunches 7 stands around the ejectors 6 with accommodated in a nib 9 formed on a nib booth 8.

FIG. 1 is an illustrative view illustrating an apparatus for manufacturing the gears. 1 is a drag, and 2 is a cope. The drag 1 comprises a tooth forms 4 for forming tooth forms on an inner circumferential surface of a cavity 3, ejectors 6 are arranged at a center of a bottom part of the cavity 3 moving up and down through knockout pins 5 and counterpunches 7 stands around the ejectors 6 with accommodated in a nib 9 formed on a nib booth 8.

The cope 2 comprises a clump of punches comprising an inner punch 11, a center punch 12, and an outer punch 13 is concentrically arranged from inside thereof around a mandrel 10 located in the center of the cope, and these are clumped with a cope clamp ring 14 and are assembled to a body part 15 of the cope.

Concave portions 16 for escape of pads as the projection are formed in a portion, corresponding to the counterpunch 7 of the drag 1, of the center punch 12, and tooth forms 17 corresponding to the tooth forms 4 for forming tooth forms formed on the inner surface of the cavity 3 are formed at the outer punch 13.

Naturally, there is no phase lag between the tooth forms 4 for forming tooth forms and the tooth forms 17.

The process of forming a primary formed article in the form of gears having window holes by the forging device will now be described. A primary formed article 18 is a ring-shaped platen, a clutch tooth 19 having a chamfer is preformed on an outer peripheral surface and on the other side face, a concave member 20 is formed at a part for forming window holes.

The major diameter of the primary formed article 18 is determined so as to be of a slightly less diameter than that of a final product. If necessary, the primary formed article 18 is treated by head end processes such as, heat treating, shot blast and bonding.

Figure 2:
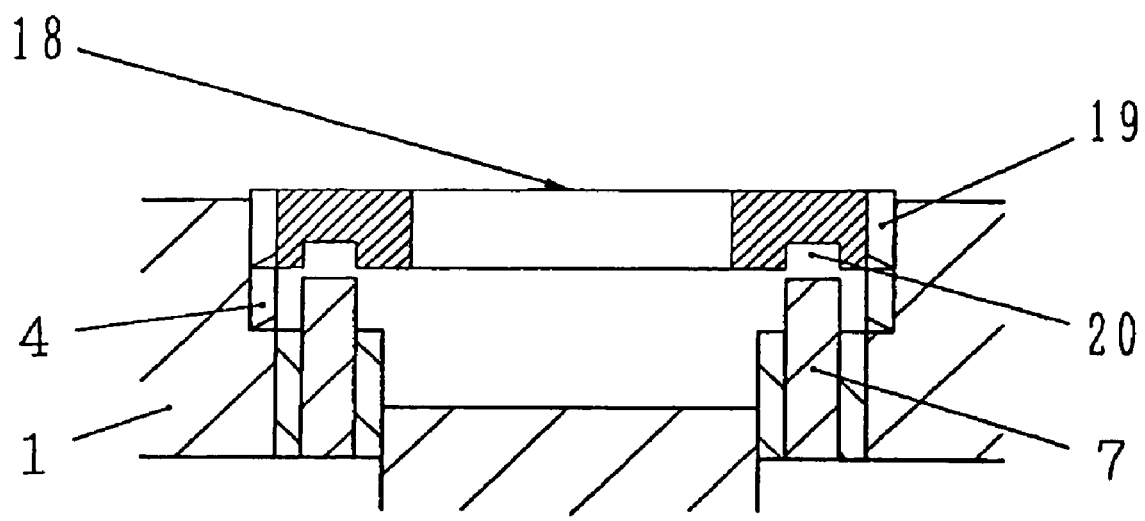
FIG. 2 is an illustrative view illustrating a step of setting the primary formed article according to the embodiment of the present invention.
Figure 3:
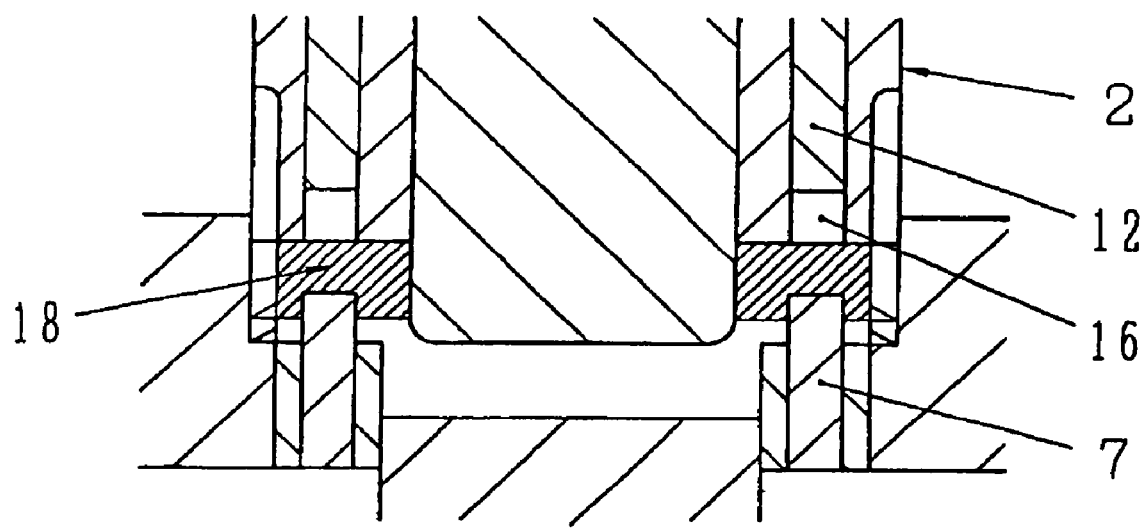
FIG. 3 is an illustrative view illustrating a molding process according to the embodiment of the present invention.
Figure 4:
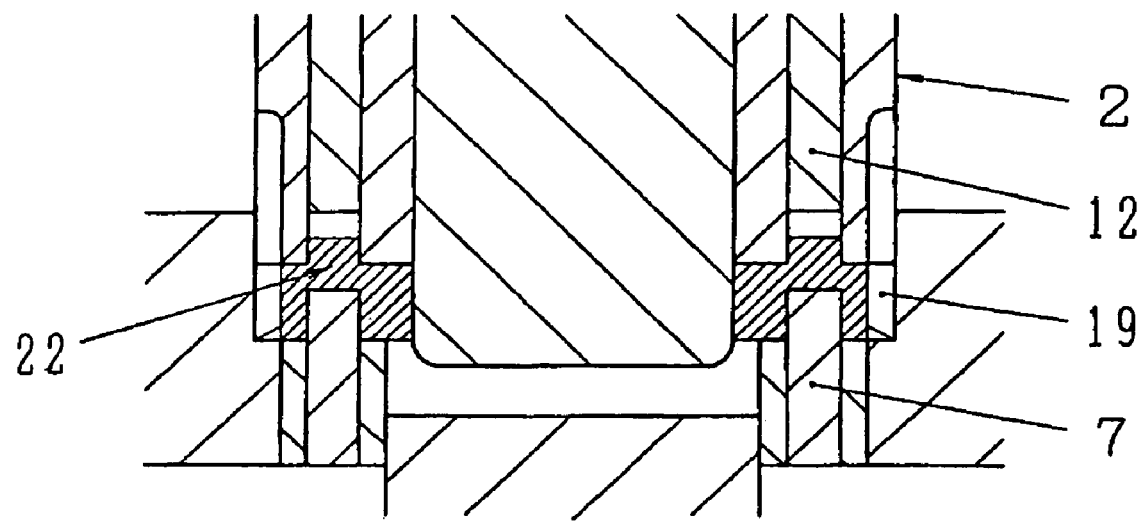
FIG. 4 is an illustrative view illustrating a final step of molding process according to the embodiment of the present invention.
Figure 5:
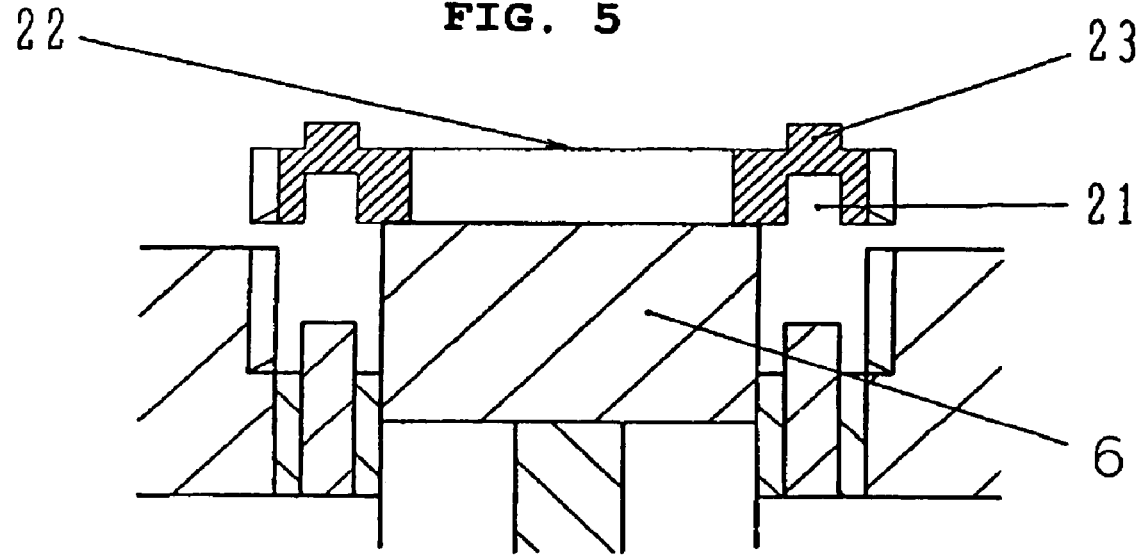
FIG. 5 is an illustrative view illustrating a unmold process according to the embodiment of the present invention.

The primary formed article 18 is set at the side having the concavities 20 below, and set to the drag 1 in order that there is no phase lag between the concavities 20, and the counterpunches 7 and the tooth forms 4 for forming tooth forms (FIG. 2). Then by sending the cope 2 downward, the primary formed article 18 is depressed by a clump of punches, wherein the concavities 20 are held by the counterpunches 7 (FIG. 3), the counterpunches 7 are deeply compressed into the primary formed article 18 and the concave portions 21 are formed by moving the cope 2 down. The resultant pads as projections are extruded into concave portion 16 formed at the center punch 12 of the clump of punches. Accordingly material flow in the radial direction thereof occurs and the clutch tooth form 19 is projected outwardly in radial directions thereof (FIG. 4). After depressing and sending the cope 2 upward, the product is remolded by ejectors 6 (FIG. 5).

The remolded products 22 satisfy a formal measurement of product by depressing and are finished into the high precision clutch tooth by overhang stress in radial direction thereof. The metal of the window hole forming part is projected from the other end surface and the stress is dispersed. Accordingly it is able to maintain a uniform form of the clutch tooth all over the round.

Raised parts 23 as projections extruded from the other end surface in the axial direction thereof forming the concave portions 21 and from the other side of surface. Accordingly, the raised parts 23 are cut off along the other side surface by cutting.

Figure 6:
FIG. 6 is an illustrative view illustrating forms of products of window holes with bottoms and penetrated window holes according to the embodiment of the present invention.
Figure 6:

It is possible to provide a product having window holes with a bottom by cutting one end surface of the primary formed article just before touching the other end surface and it is possible to provide penetrated window holes by depressing one end surface of the primary formed article until touching a bottom of the window hole (FIG. 6).

Since the concavities are formed by forging, the degree of freedom of forms possibly increases. The clutch tooth and the concavities for window holes are worked off in the same dye. Accordingly a hole phase toward the clutch tooth is accurate. Moreover, it is able to select between two surfaces for forming concavities 21 when forming a window hole with a bottom.

According to the above described embodiment of the present invention, when forming a window hole, plurality of concavities are formed by depressing one end surface of the primary formed article. In other words, the metal corresponding to the window holes are depressed in a pressurized direction and the precision of the tooth forms is improved by overhang stress in radial direction thereof. Accordingly it is able to provide high quality and good process yield products.

Moreover, because the extruded pads remains extruded to pressurized direction, it is not necessary to consider expulsion methods such as cutting weld flash and the structure of mold is not complicated. Furthermore, the forms of window holes formed at products have a choice between a window hole with a bottom and a penetrated window hole by control the depth of cut.

The preferred embodiment of the present invention, as herein disclosed, are taken as an embodiment for explaining the present invention. It is to be understood that the present invention should not be restricted by this embodiment and any modifications beyond the technical idea or principle based on descriptions of the scope of the patent claims.

What is claimed is:

1. A forged gear having window holes, comprising:
a plurality of forged tooth forms, preformed at an outer peripheral wall of said forged gear, and projected outwardly in a radial direction of said forged gear said tooth forms comprising outwardly flowed forged material which includes forged, overhanging stressed portions oriented in said radial direction,
a plurality of forged concavities for window holes formed at said one end surface in the axial direction thereof by counterpunches axially interposed in a drag, and
a plurality of forged projections which are projected from a second end surface thereof in forged concave portions formed at punches axially interposed in a cope, wherein
said plurality of projections are respectively provided opposite said plurality of concavities.

2. A gear having at least one window hole according to claim 1, wherein
said at least one output window hole has a bottom formed by cutting said one end surface of said forged gear immediately before contacting the second end surface thereof.

3. A gear having window holes according to claim 1, wherein
said at least one window hole comprise a penetrated window hole formed by cutting said one end surface of said forged gear until contacting a bottom portion of said at least one window hole.

4. A gear having window hole according to claim 1, wherein
said forged tooth form comprises a plurality of forged clutch teeth.

5. A gear having window hole according to claim 1, wherein
said forged clutch teeth have a chamfer portion.

* * * * *